July 9, 1929.  C. C. FARMER  1,720,265

VALVE LUBRICATOR

Filed Aug. 4, 1927

INVENTOR
CLYDE C. FARMER
BY Wm. M. Cady
ATTORNEY

Patented July 9, 1929.

1,720,265

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

VALVE LUBRICATOR.

Application filed August 4, 1927. Serial No. 210,573.

This invention relates to fluid pressure brake apparatus and particularly to the brake valve device of such apparatus and has for an object the provision of a simple and efficient lubricating system for such a device.

Figure 1:
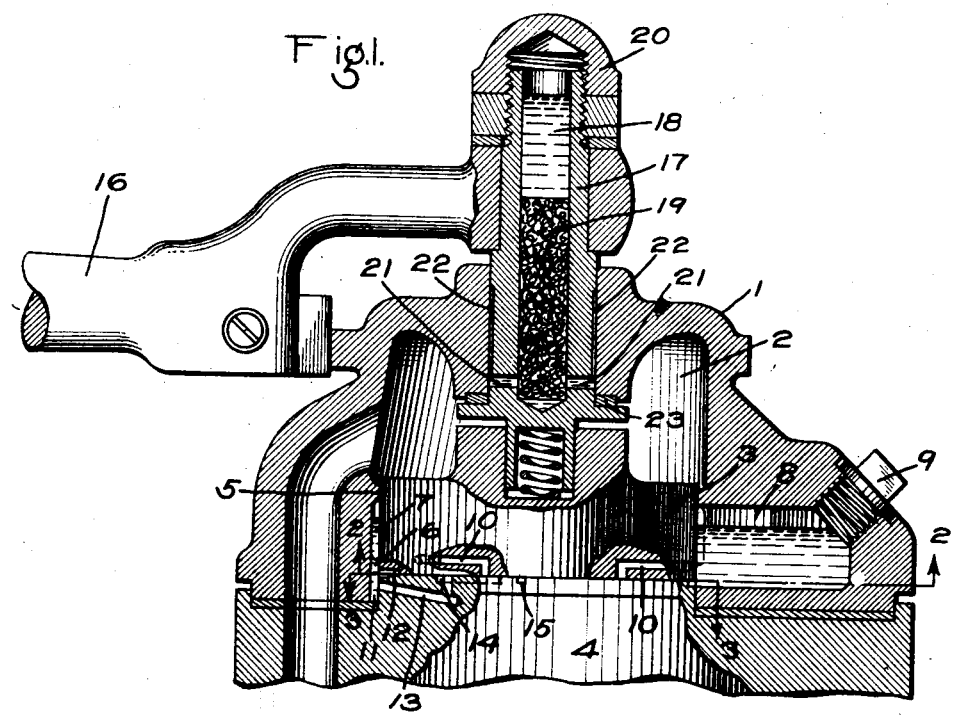
Figure 2:
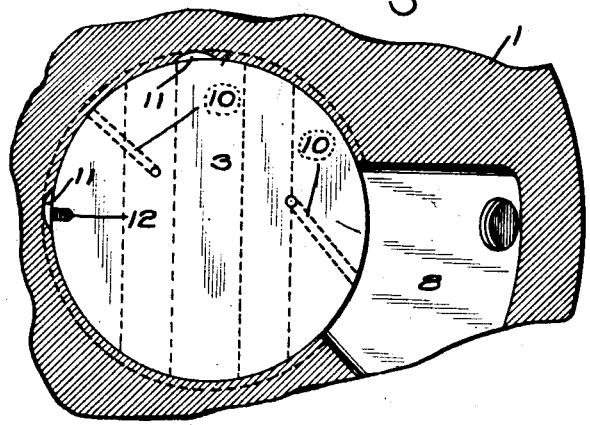
Figure 3:
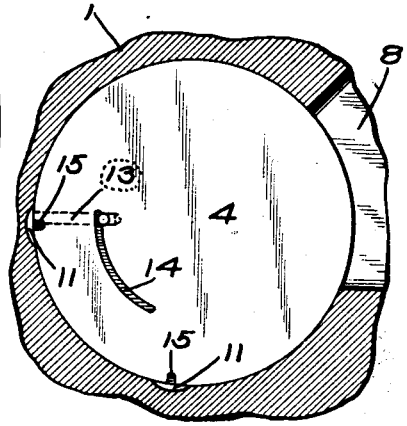
Figure 4:
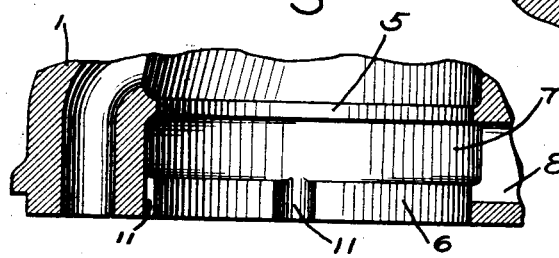

In the accompanying drawing, Fig. 1 is a vertical sectional view taken centrally through a brake valve device embodying my invention, portions of the rotary valve and rotary valve seat being shown in elevation; Figs. 2 and 3 are horizontal sectional views taken on the lines 2—2 and 3—3 respectively, of Fig. 1; and Fig. 4 is a vertical sectional view of a portion of the brake valve device.

As shown in the drawing, the brake valve device may comprise a casing 1 having a chamber 2 containing a rotary valve 3 and a rotary valve seat 4, said valve and seat having any desired arrangement of fluid pressure conducting cavities and passages.

The face of the rotary valve 3 slidably contacts with the face of the rotary valve seat 4, and a portion of the periphery of this valve slidably contacts with spaced portions 5 and 6 of the casing, between which portions a groove 7 is formed, extending partially around the rotary valve and at its ends opens into a recess or reservoir 8 adapted to receive a supply of lubricant such as oil, there being an opening formed in the casing through which the oil can be poured into the reservoir, which opening may be closed by a screw-threaded plug 9, adapted to have screw-threaded engagement with the casing. It will be noted that when the rotary valve 3 is in its proper operative position, the peripheral surface of this valve, together with the portions 5 and 6 of the casing and the portion of the casing forming the groove 7, will form in effect a duct or passage which will conduct oil from the reservoir 8, so that when the reservoir is filled to a suitable level the periphery of the valve 3 will be surrounded by oil at substantially the same level.

For the purpose of lubricating the contacting faces of the rotary valve 3 and the rotary valve seat 4, a system of passages and grooves are provided for conducting oil to these faces. In the drawing, the rotary valve 3 has been shown as having passages 10 through which oil from the duct surrounding the rotary valve or directly from the reservoir 8 is adapted to flow to the contacting faces of the valve and valve seat. As the contacting faces of the rotary valve and the rotary valve seat are below the oil in the groove 7, the portion 6 of the casing is provided with vertically disposed grooves 11 which are adapted to conduct oil from the groove 7 to a point below the above mentioned faces, and as these grooves are open throughout their length and as the reservoir 8 is open at one side, the peripheral surface of the rotary valve 3, which contacts with the portion 6 of the casing will be effectively lubricated. The face of the rotary valve is provided with a groove 12 through which oil from one of the slots 11 is adapted to flow between the valve and valve seat. Below the contacting faces of the valve and valve seat, the valve seat is provided with a passage 13 which at its outer end is open to one of the grooves 11 and extends inwardly some distance and then upwardly and opens into a curved slot 14 formed in the face of rotary valve seat. The rotary valve seat is also provided with grooves 15 through which oil is adapted to flow from the grooves 11 to the contacting faces of the valve and valve seat. When the rotary valve is operated it will be seen that a film of oil will be effectively spread over the contacting faces of the rotary valve and seat. The oil passages and grooves just described are preferably arranged in both the rotary valve and rotary valve seat, in such a manner, that none of them will be open to any of the usual air passages and cavities. It will be understood that the arrangement and number of oil passages and grooves described herein and shown in the drawing may be changed without departing from my invention.

For the purpose of operating the rotary valve 3 a handle 16 is provided, one end of which is secured to the upper end of a rotary valve key 17, the lower end engaging the rotary valve so that, rotary movement of the handle is transmitted to the valve. Intermediate the handle and the rotary valve the key is journalled in the housing 1. This key 17 has a central recess or bore 18 containing felt 19 or any other suitable oil absorbing medium, and above the felt, containing a supply of lubricating oil, which oil may be supplied after the removal of a cap nut 20, which has screw-threaded engagement with the upper end portion of the key. Adjacent the lower end of the bore 18 there are a plurality of transverse passages 21 through which the oil seeping through the felt 19, is adapted to flow to longitudinal grooves 22 formed in the exterior of the journalled portion of the key and to prevent leakage of the oil into the chamber 2, a washer 23 is interposed between the key and the casing 1. It will thus be noted that the oil will seek its own level and will maintain the grooves 22 filled at all times, thus effectively lubricating the bearing between the key and the casing.

Having now described my invention, what I claim as new and desire to secure by Letters Patent, is:—

1. In a brake valve device, the combination with a casing having a supply reservoir containing a lubricant, of a rotary valve operatively mounted in said casing, said casing and valve defining a duct having its ends opening into said reservoir and containing lubricant from said reservoir, and said valve having a passage for conducting lubricant from said duct to the face of said rotary valve.

2. In a brake valve device, the combination with a casing, of a lubricant supply reservoir, and a rotary valve operatively mounted in said casing, said valve and casing forming a lubricant conducting passage around said valve, the ends of which duct open into said reservoir, and said valve having a passage adapted to conduct lubricant from the first mentioned passage to the face of the rotary valve.

3. In a brake valve device, the combination with a casing, of a lubricant supply reservoir, a rotary valve operatively mounted in said casing, a seat for said valve, said valve and seat having longitudinally disposed contacting faces, and means for conducting lubricant from said reservoir to said contacting faces.

4. In a brake valve device, the combination with a casing, of a lubricant supply reservoir, a rotary valve operatively mounted in said casing, a seat for said valve, said valve and seat having contacting faces, and means for conducting lubricant from said reservoir to said contacting faces, said means comprising a lubricant conducting passage formed by said casing and valve, a passage formed in said valve adapted to conduct lubricant from the first mentioned passage to the face of the valve, a passage formed in said rotary valve seat adapted to conduct lubricant to the face of the valve seat, and a groove for conducting lubricant from the first mentioned passage to the last mentioned passage.

5. In a brake valve device, the combination with a casing having a lubricant supply reservoir formed therein, of a rotary valve which together with said casing forms a lubricant supply duct from said reservoir, and a rotary valve seat, said valve and seat having ducts for conducting lubricant from said supply duct to the contacting faces of said valve and seat.

6. In a brake valve device, the combination with a casing having a lubricant supply reservoir formed therein, of a rotary valve which together with said casing forms a lubricant supply duct from said reservoir, and a rotary valve seat, said valve and seat having ducts for conducting lubricant from said supply duct to the contacting faces of said valve and seat, said ducts being so arranged that rotary movement of said valve will spread lubricant, from said ducts, over said contacting faces.

7. In a brake valve device, the combination with a casing, of a lubricant supply reservoir associated with said casing, a rotary valve in said casing, a seat for said valve, said valve and seat having contacting faces, means for conducting lubricant from said reservoir to said contacting faces, and a stem rotatably mounted in said casing for operating said valve, said stem having a central bore adapted to contain a supply of lubricant and having transverse passages for conducting lubricant from said bore to grooves formed in the exterior portion of said key, the lubricant in said grooves being adapted to lubricate the bearing of the key with the casing.

8. In a valve device, the combination with a casing having a valve chamber and a chamber containing a lubricant, of a valve mounted in said valve chamber, said valve having a passage leading to the face of the valve and opening to a duct disposed between the valve and the casing and supplied with lubricant from said lubricant chamber.

9. In a valve device, the combination with a casing having a valve chamber and a chamber containing a lubricant, of a valve mounted in said valve chamber, said casing having an annular recess opening into said lubricant chamber and said valve having a passage opening to said recess and leading to the face of the valve.

In testimony whereof I have hereunto set my hand.

CLYDE C. FARMER.